United States Patent [19]

Marshall

[11] 3,713,131

[45] Jan. 23, 1973

[54] HORN BLOWER FISHING ROD HOLDER

[76] Inventor: William R. Marshall, 220 Cherokee Lane, El Reno, Okla. 73036

[22] Filed: April 2, 1971

[21] Appl. No.: 130,746

[52] U.S. Cl. ..................340/279, 43/17, 340/282
[51] Int. Cl. .................................................A01k 97/12
[58] Field of Search ..................43/17; 340/279, 282

[56] References Cited

UNITED STATES PATENTS

| | | | |
|---|---|---|---|
| 2,745,088 | 5/1956 | Bauer | 43/17 |
| 2,816,388 | 12/1957 | Hartley | 43/17 |

Primary Examiner—John W. Caldwell
Assistant Examiner—Glenn R. Swann, III
Attorney—Robert K. Rhea

[57] ABSTRACT

An upwardly open cylindrical fishing rod holding tube is secured to a plate hingedly connected about a horizontal axis to a base in turn supported by earth engaging spikes. An arm on the plate closes a switch to energize an electrical audible signal device supported by the base in response to a fish strike. Bolt and spring means adjustably resist pivoting movement of the plate about its horizontal axis for normally maintaining the switch open.

3 Claims, 3 Drawing Figures

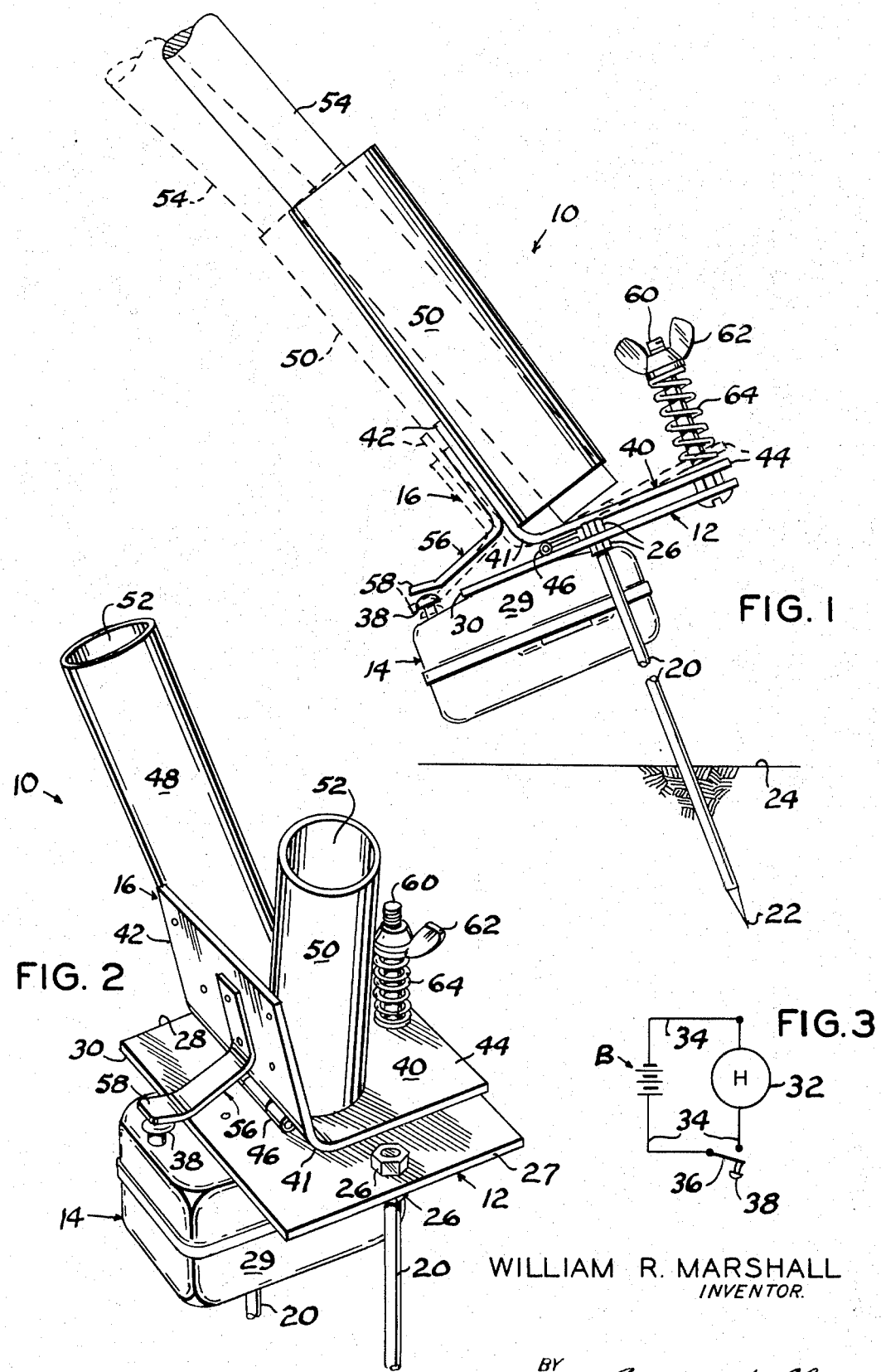

HORN BLOWER FISHING ROD HOLDER

BACKGROUND OF THE INVENTION

1. Field of the Invention

The present invention relates to fishing and more particularly to a fishing rod holder for generating an audible alarm in response to a fish bite.

While bank fishing with a plurality of fishing rods or poles it is desirable that the fisherman be signaled when a bite occurs on one of the fishing lines in order that the fisherman may grasp the fishing pole and set the hook in the mouth of the fish for reeling or pulling in the fish. This device permits the fisherman to care for his fishing equipment, such as baiting other hooks or performing camping chores, without constantly watching the baited lines in the water.

2. Description of the Prior Art

Prior patents disclose a plurality of fish bite signalling devices which, for the most part, disclose a rod holding socket pivotally connected with an earth supported standard and includes an electrical circuit exciting a lamp or sounding a signal wherein the arrangement of the components are not simply and sturdily constructed and for the most part have not been generally accepted. U.S. Pat. Nos. 2,704,411 and 2,745,088 disclose a signal device of this type.

SUMMARY OF THE INVENTION

A pair of earth engaging spikes are connected with a base and support the latter above the surface of the earth. An angular shaped plate is hingedly connected to the upper surface of the base for vertical movement of its respective end portions about a horizontal axis. One or more upwardly open cylindrical tubes, secured to one end of the plate, form fishing rod or pole handle receiving sockets. An arm, secured to the socket equipped end of the plate, is movable toward and away from a switch forming a part of an electrical horn blowing circuit within a housing secured to the depending surface of the base for closing the switch and sounding an alarm in response to a fish bite on a fishing rod or pole. Pivoting movement of the plate with respect to the base for closing the switch is adjustably regulated by spring and bolt means joining the end of the plate opposite the sockets to the base.

The principal object of this invention is to provide a fishing rod holding audible signal device sturdily constructed of and employing a minimum of components which will not easily get out of order.

BRIEF DESCRIPTION OF THE DRAWINGS

FIG. 1 is a fragmentary side elevational view of the fishing rod holder in an operative position illustrating, by dotted lines, its position when sounding an alarm;

FIG. 2 is a fragmentary perspective view of the fishing rod holding device, per se; and, FIG. 3 is a wiring diagram.

DESCRIPTION OF THE PREFERRED EMBODIMENT

Like characters of reference designate like parts in those figures of the drawings in which they occur.

In the drawings:

The reference numeral 10 indicates the device, as a whole, comprising a base 12, a signalling device 14 and rod holding means 16. The base 12 preferably comprises a rectangular section of plate material, such as metal. A pair of rods 20, each having a sharpened end portion 22, form spikes for entering the surface of the earth 24, which are connected at their upper ends by nuts 26 threadedly secured to the respective spike on opposing sides of the plate having an aperture, not shown, adjacent opposing marginal edges 27 and 28, for receiving the upper end portion of the spikes.

The signal means 14 comprises a substantially rectangular housing 29 secured in depending relation to the depending surface of the base 12 so that a portion of the housing 29 projects beyond the front edge 30 of the base. The housing 29 contains a vibratory type horn 32 connected by wiring 34 with a battery B through a switch 36. The switch 36 includes a stem portion 38 projecting upwardly through the housing wall forwardly of the base edge 30 for closing the switch in the manner presently explained.

The rod holding means 16 comprises a plate 40 transversely bent, at an obtuse angle, intermediate its ends, as at 41, to form leg-like end portions 42 and 44. A strap hinge 46 has its straps, respectively, secured to the depending surface of the plate leg 44 adjacent the bend 41 with the other strap of the hinge secured to the upper surface of the base 12 so that the pin of the hinge 46 forms a horizontal axis for vertical pivoting movement of the respective plate legs 42 and 44 about the hinge axis. The leg 44 is thus disposed substantially parallel with the base 12 while the leg 42 extends angularly forward and upward. A plurality of open ended cylindrical tubes 48 and 50 are secured by a longitudinal portion of the respective tube wall to one surface of the plate leg 42 in upwardly preferably diverging relation, with the depending end of each tube adjacent the leg 44, so that each of the tubes present an upwardly open end portion forming a pair of sockets 52 for receiving the handle portion of a fishing rod 54, or the like. The plate leg 44 supports the rod handle 54 within the respective socket. A strap-like arm 56 is secured at one end portion to the surface of the plate leg 42 opposite the tubes 48 and 50 and projects angularly downwardly and forwardly of the front edge 30 of the base terminating in a forwardly extending end portion 58 overlying the switch stem 38 in spaced relation. The rearward edge portion of the base 12, opposite its front edge 30 and the overlying edge portion of the plate leg 44, are line drilled for receiving a bolt 60 and thumb screw 62 extending upwardly beyond the upper surface of the plate leg 44. A helical spring 64 surrounds the bolt 60 between the plate leg 44 and thumb screw 62 for biasing the plate leg 44 toward the base 12 and permitting pivoting movement of the plate about the axis of the hinge 46.

OPERATION

In operation the device 10 is preferably disposed in a substantially vertical position, as shown in FIG. 2, or an angular position with respect to the surface of the earth 24, as shown in FIG. 1, by manually forcing the rods 20 into the earth. Prior to placing the device 10 in operation, the thumb screw 62 is normally tightened against the spring 64 to maintain the horn 32 inoperative. A pole or the fishing rod 54, after being baited, and having its line, not shown, positioned in the water being fished has the handle end portion thereof placed within one of the sockets 52. The tension of the spring 64 is then adjusted by the thumb screw 62 to compensate for the mass of the fishing rod and position the arm end portion 58 in close spaced relation with respect to the switch stem 38 so that a fish bite or pull on the line connected with the fishing rod 54 pivots the plate 40 about the axis of the hinge 46 wherein the arm end portion 58 contacts the switch stem 38 thus closing the electrical circuit and sounding the horn 32. Obviously the thumb screw 62 may be adjusted for responding respectively to a weak or strong pull on the fishing rod 54 as is desired.

Obviously the invention is susceptible to changes or alterations without defeating its practicability, therefore, I do not wish to be confined to the preferred embodiment shown in the drawings and described herein.

I claim:
1. A fishing rod holder, comprising:
 a flat base having an upper surface and having a forward edge;
 at least one rod connected with said base and supporting the latter in spaced relation with respect to the surface of the earth;
 audible signal means connected with said base in depending relation, said audible signal means including an electrical circuit having a normally open switch having an upstanding switch arm intersecting the plane of the upper surface of said base;
 rod holding socket means mounted on said base for pivoting movement toward said switch arm; and,
 resilient means normally preventing pivoting movement of said socket means toward said switch arm.

2. The fishing rod holder according to claim 1 in which said socket means includes:
 an elongated plate transversely bent, intermediate its ends, at
  an obtuse angle forming plate leg portions,
   one said leg portion being disposed adjacent the upper surface of said base in overlying relation,
   the other said leg portion extending upwardly from the upper surface of said base and forwardly toward the forward edge of said base;
 hinge means interposed between and respectively connected with the upper surface of said base and said plate adjacent its transverse bend for vertical pivoting movement of said plate about a horizontal axis;
 at least one upwardly open tube having its wall secured to one surface of said upwardly directed other leg portion; and,
 a plate arm connected, at one end portion, with said upwardly directed other leg portion, the other end portion of said plate arm terminating in overlying relation with respect to said switch arm.

3. The fishing rod holder according to claim 2 in which said resilient means includes:
 a bolt extending through said base and the first named plate leg portion;
 a nut-like member threadedly engaged with the end portion of said bolt projecting through said base and plate leg portion; and,
 a spring surrounding said bolt between said base and said nut-like member.

* * * * *